United States Patent
Chen et al.

(10) Patent No.: US 8,574,526 B2
(45) Date of Patent: Nov. 5, 2013

(54) CYCLIC PREPARATION METHOD FOR PRODUCING TITANIUM BORIDE FROM INTERMEDIATE FEEDSTOCK SODIUM-BASED TITANIUM-BORON-FLUORINE SALT MIXTURE AND PRODUCING SODIUM CRYOLITE AS BYPRODUCT

(71) Applicant: Shenzhen Sunxing Light Alloys Materials Co., Ltd, Guangdong (CN)

(72) Inventors: Xuemin Chen, Guangdong (CN); Yueming Yu, Guangdong (CN); Qingdong Ye, Guangdong (CN); Jun Yang, Guangdong (CN); Zhi Zhou, Guangdong (CN)

(73) Assignee: Shenzhen Sunxing Light Alloys Materials Co., Ltd., Shenzhen (CN)

( * ) Notice: Subject to any disclaimer, the term of this patent is extended or adjusted under 35 U.S.C. 154(b) by 0 days.

(21) Appl. No.: 13/708,961

(22) Filed: Dec. 8, 2012

(65) Prior Publication Data
US 2013/0095020 A1 Apr. 18, 2013

(30) Foreign Application Priority Data
Mar. 7, 2012 (CN) .......................... 2012 1 0057848

(51) Int. Cl.
| | | |
|---|---|---|
| C01B 9/08 | (2006.01) |
| C01F 3/00 | (2006.01) |
| C01F 7/00 | (2006.01) |
| C01B 35/04 | (2006.01) |
| B22F 1/00 | (2006.01) |
| B22F 9/00 | (2006.01) |
| C01B 35/00 | (2006.01) |
| C01B 25/08 | (2006.01) |

(52) U.S. Cl.
USPC ........... 423/297; 423/489; 423/495; 423/135; 423/276; 423/289; 72/255; 72/363

(58) Field of Classification Search
None
See application file for complete search history.

(56) References Cited

U.S. PATENT DOCUMENTS

| | | | |
|---|---|---|---|
| 5,057,150 A * | 10/1991 | Reeve et al. ..................... 75/671 |
| 7,501,081 B2 * | 3/2009 | Chandran ................ 252/520.22 |
| 7,541,013 B2 * | 6/2009 | Shim et al. .................... 423/297 |
| 2010/0173170 A1 * | 7/2010 | Pretorius ....................... 428/570 |
| 2012/0034141 A1 * | 2/2012 | Kruglick ......................... 423/68 |

* cited by examiner

Primary Examiner — Guinever Gregorio
(74) Attorney, Agent, or Firm — Jackson IPG PLLC

(57) ABSTRACT

A cyclic preparation method for producing titanium boride from intermediate feedstock sodium-based titanium-boron-fluorine salt mixture and producing sodium cryolite as byproduct, which comprises the steps: a) boric acid or boric anhydride is added with hydrofluoric acid and then with sodium carbonate solution for concentration and crystallization to generate sodium fluoborate; titanium-iron concentrate is added with hydrofluoric acid and then with sodium carbonate and sodium hydroxide to obtain sodium fluotitanate; B) the sodium fluoborate is mixed with the sodium fluotitanate, and the mixture reacts with aluminum to generate titanium boride and sodium cryolite; C) the sodium cryolite is sucked out and then fed into a rotary reaction kettle together with concentrated sulfuric acid, hydrogen fluoride gas as well as sodium sulfate and sodium aluminum sulfate are generated by reaction in the rotary reaction kettle, and the hydrogen fluoride gas is collected and then dissolved in water to obtain hydrofluoric acid aqueous solution; and D) the obtained hydrofluoric acid aqueous solution is recycled.

3 Claims, 2 Drawing Sheets

CYCLIC PREPARATION METHOD FOR PRODUCING TITANIUM BORIDE FROM INTERMEDIATE FEEDSTOCK SODIUM-BASED TITANIUM-BORON-FLUORINE SALT MIXTURE AND PRODUCING SODIUM CRYOLITE AS BYPRODUCT

TECHNICAL FIELD OF THE INVENTION

The invention relates to a preparation method of titanium boride, more particularly to a cyclic preparation method for producing titanium boride from intermediate feedstock sodium-based titanium-boron-fluorine salt mixture and producing sodium cryolite as byproduct.

BACKGROUND OF THE INVENTION

Generally, there are three industrial methods for producing titanium boride in industry:
(1) Direct reaction of metal titanium and element boron at high temperature: $Ti+2B=TiB_2$;
(2) Boron carbide method: direct reaction of titanium dioxide and boron carbide in a carbon tube at the presence of C:
$2TiO_2+B_4C+3C=2TiB_2+4CO$, the reaction temperature is within a range from 1800° C. to 1900° C. if the carbon tube is under the atmosphere of $H_2$; and the reaction temperature can be lowered to be within a range from 1650° C. to 1750° C. if the carbon tube is under vacuum;
(3) vapor deposition method: with $TiCl_4$ and $BCl_3$ as feedstock, the reaction below is performed under the participation of $H_2$:
$TiCl_4+BCl_3+5H_2=TiB_2+10HCl$; the deposition temperature is within a range from 8000° C. to 1000° C., and abrasive-grade and electronic-grade products can be manufactured.

The three preparation methods above have the following features in common: high reaction temperature, strict reaction conditions, typically less than 90% of reaction yield, and high comprehensive preparation cost.

The method for preparing sodium fluoroaluminate (sodium cryolite) in industry is typically synthesis method: anhydrous hydrofluoric acid reacts with aluminum hydroxide to generate fluoaluminic acid, which then reacts with sodium hydroxide at high temperature, and fluoroaluminate product is prepared after filtering, drying, melting and crushing; the reactions are as follows: $6HF+Al(OH)_3=AlF_3.3HF+3H_2O$ and $AlF_3.3HF+3NaOH=Na_3AlF_6+3H_2O$; the sodium fluoroaluminate, which is synthesized using such a method, has a relative molecular weight of 209.94 and a molecular formula of $AlF_3.mNaF$ (m=3.0). The sodium cryolite prepared using the current industrial synthesis methods generally has a molecular ratio m between 2.0 and 3.0, so it is difficult to prepare pure low-molecular-weight sodium cryolite having a molecular ratio m between 1.0 and 1.5.

SUMMARY OF THE INVENTION

In order to solve the problem about large-scale industrial production of pure low-molecular-weight sodium cryolite in the prior art to further meet the demand of low-temperature aluminum electrolysis industry on electrolyte; the inventor has made tremendous researches on selection for intermediate feedstock and cyclic treatment for byproduct and has unexpectedly found that, titanium boride ($TiB_2$) is produced from intermediate feedstock sodium-based titanium-boron-fluorine salt mixture (the mixture of sodium fluoborate and sodium fluotitanate) and sodium cryolite

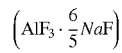

with a molecular ratio m of 1.2 and a relative molecular weight of 134.4 is also produced as byproduct, besides, the objective of preparing titanium boride cyclically can be reached if further chemical reactions are implemented on this sodium cryolite, and the titanium boride ($TiB_2$) obtained can be used as a coating for covering the surface of carbon cathode in aluminum electrolysis industry, thus improving the wetness between metal aluminum and electrode and further contributing to the development of low-temperature aluminum electrolysis industry; and compared with the traditional dominant preparation methods, the invention with simple process is low in preparation cost and reaction temperature, has a reaction yield more than 95% and high quality of the resultant products, and can realize the recycling of byproduct, improve the production efficiency and reduce the pollution to environment.

The invention provides a cyclic preparation method for producing titanium boride from intermediate feedstock sodium-based titanium-boron-fluorine salt mixture and producing sodium cryolite as byproduct, which comprises the following steps:

A) boric acid or boric anhydride is added with hydrofluoric acid to generate fluoroboric acid by reaction at 100-200° C., the fluoroboric acid is then added with sodium carbonate aqueous solution for reaction to generate sodium fluoborate solution, and the sodium fluoborate solution is concentrated, crystallized and bleached to obtain sodium fluoborate; titanium-iron concentrate is added with hydrofluoric acid to generate fluotitanic acid by reaction at 100-200° C.; the fluotitanic acid is then added with the mixed salt aqueous solution of sodium carbonate and sodium hydroxide, pH is controlled within a range from 3 to 4, and after water and oxides of ferrous iron and ferric iron are separated, the mixed salt aqueous solution is further added to result in pH within a range from 7 to 8 so as to obtain sodium fluotitanate solution, and the sodium fluotitanate solution is concentrated, crystallized and bleached to obtain sodium fluotitanate; the chemical reactions involved are as follows: $H_3BO_3+4HF=HBF_4+3H_2O$, $B_2O_3+8HF=2HBF_4+3H_2O$, $6HF+TiO_2=H_2TiF_6+2H_2O$, $2HBF_4+Na_2CO_3=2NaBF_4+CO_2\uparrow+H_2O$ and

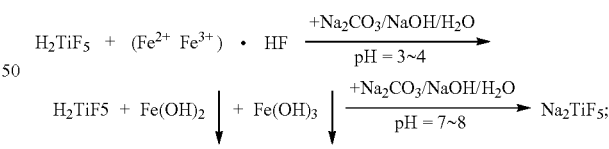

B) the sodium fluoborate and the sodium fluotitanate are put in a reactor based on a molar ratio of 2:1, inert gas is fed into the reactor after evacuation, the reactor is heated up to 700-800° C. and then added with aluminum, and titanium boride and sodium cryolite are generated by rapid stirring and then reaction for 4-6 hours; or aluminum is put in the reactor, inert gas is fed into the reactor after evacuation, the reactor is heated up to 700-800° C. and then added with the sodium-based titanium-boron-fluorine salt mixture of sodium fluoborate and sodium fluotitanate based on a molar ratio of 2:1, and titanium boride and sodium cryolite are generated by rapid stirring and then reaction for 4-6 hours; the chemical reaction involved is as follows:

$$Na_2TiF_6 + 2NaBF_4 + \frac{10}{3}Al = TiB_2 + \frac{10}{3}AlF_3 \cdot \frac{6}{5}NaF;$$

C) the sodium cryolite is sucked out and then fed into a rotary reaction kettle together with concentrated sulfuric acid, hydrogen fluoride gas as well as sodium sulfate and sodium aluminum sulfate are generated by reaction in the rotary reaction kettle, and the hydrogen fluoride gas is collected and then dissolved in water to obtain hydrofluoric acid; the solid mixture of sodium sulfate and sodium aluminum sulfate is crushed and then dissolved in water, sodium hydroxide is added for the purpose of reaction, and sodium sulfate aqueous solution is obtained after solid aluminum hydroxide is separated; the chemical reactions involved are as follows:

$$5AlF_3 \cdot \frac{6}{5}NaF + \frac{21}{2}H_2SO_4 = 21HF\uparrow + 5NaAl(SO_4)_2 + \frac{1}{2}Na_2SO_4$$

and $$NaAl(SO_4)_2 + Na_2SO_4 + 3NaOH = 3Na_2SO_4 + Al(OH)_3\downarrow;$$

D) the obtained hydrofluoric acid aqueous solution is recycled either for leaching titanium-iron concentrate to prepare sodium fluotitanate, or for leaching boric acid or boric anhydride to prepare sodium fluoborate.

The objectives below are reached by adopting the technical proposal above: a method for preparing low-temperature aluminum electrolyte (sodium cryolite $$\left(AlF_3 \cdot \frac{6}{5}NaF\right)$$

with a molecular ratio m of 1.2 and a relative molecular weight of 153.6 is invented, and a protection method for prolonging the life of underground fluorite resource by recycling the fluorine element in sodium cryolite is also invented; the byproduct sodium cryolite is good in application prospect and can be recycled; compared with the traditional titanium boride preparation methods, the method in the invention simplifies the process flow in the preparation of titanium boride, lowers the process condition in the preparation of titanium boride, reduces the comprehensive production cost dramatically, improve the production efficiency and reduce the pollution to environment.

As a further improvement of the invention, in the step B, aluminum under a liquid state is dropwise added to the reactor, or metal aluminum is put in the reactor at first, and after the aluminum is molten, dry sodium-based titanium-boron-fluorine salt mixture (sodium fluoborate and sodium sodium fluotitanate are mixed based on a molar ratio of 2:1) is added to the reactor in a manner of flowing; this reaction can reach 95% or above in completeness.

As a further improvement of the invention, the inert gas in the step B is argon.

Compared with the prior art, the invention has the advantages that: a preparation method that can be used for the large-scale industrial production of low-molecular-weight sodium cryolite $$\left(AlF_3 \cdot \frac{6}{5}NaF\right)$$

with a low molecular ratio m of 1.2 is invented, thus meeting the demand of low-temperature aluminum electrolysis industry on electrolyte; and in the invention, titanium boride is obtained as byproduct, so the method has the characteristics of simple preparation process and high yield compared with the prior art, besides, titanium boride can be used as a coating for covering the surface of carbon cathode in aluminum electrolysis industry, thus improving the wetness between metal aluminum and electrode and further contributing to the development of low-temperature aluminum electrolysis industry; fluorine element in sodium cryolite can be recycled so as to prolong the life of fluorite resource and reduce the pollution to environment.

DETAILED DESCRIPTION OF THE EMBODIMENTS

Figure 1:
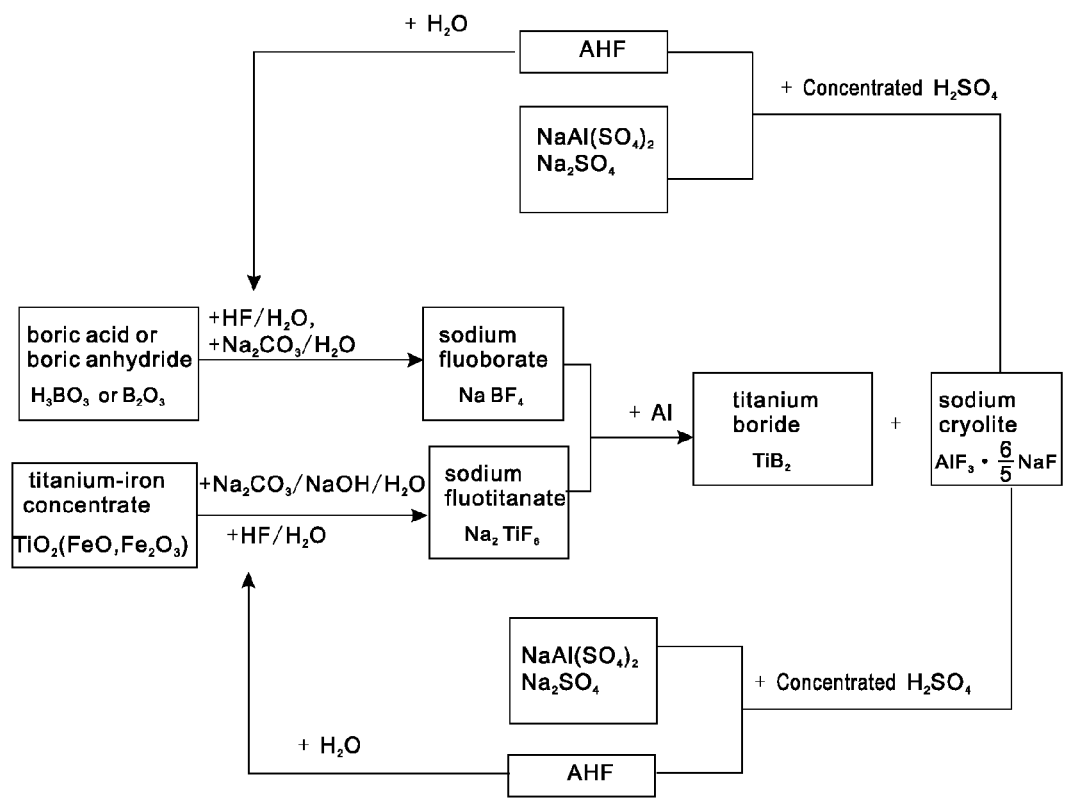
FIG. 1 is a process route chart of cyclic preparation for titanium boride and sodium cryolite in the invention.
Figure 2:
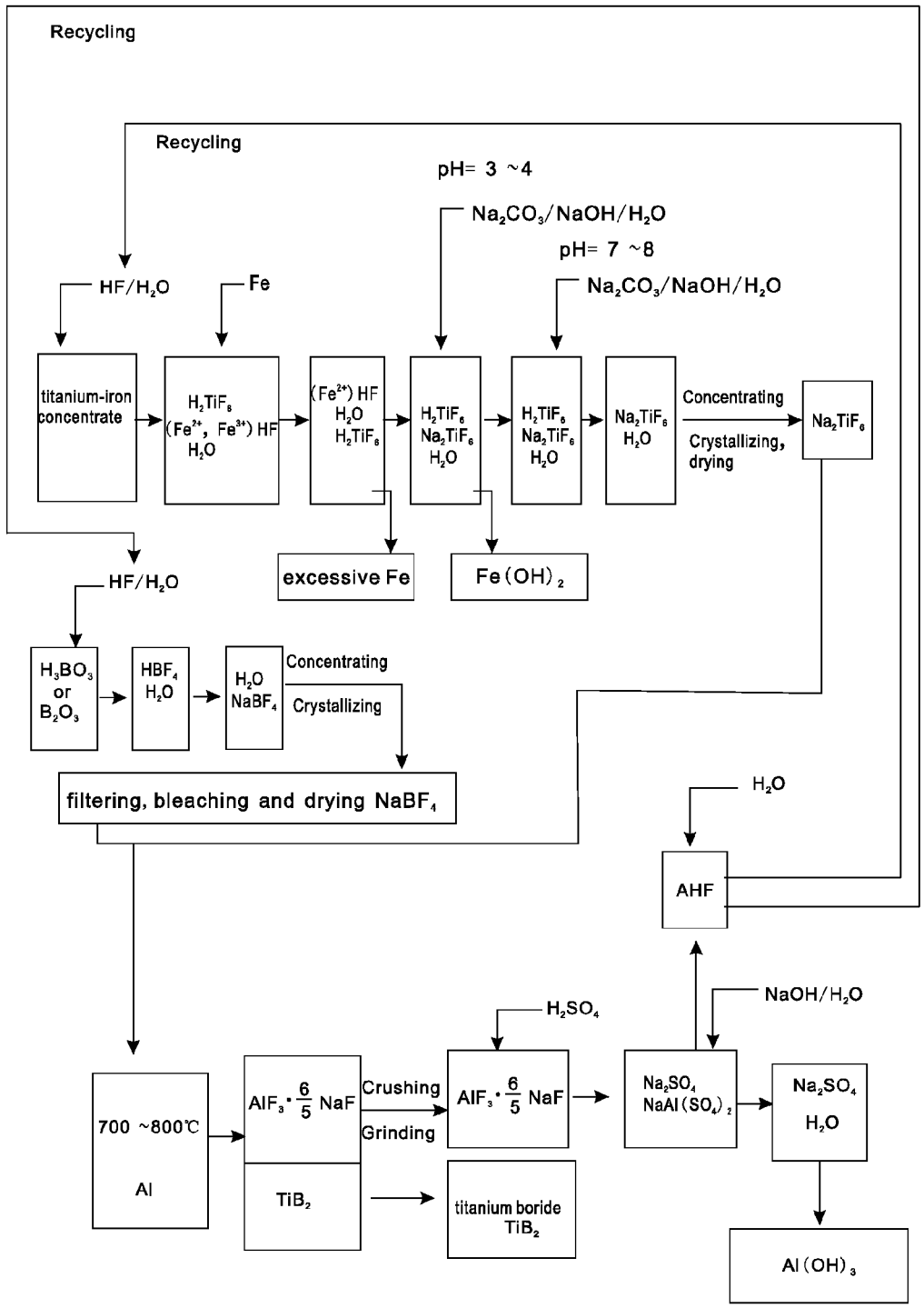
FIG. 2 is a process flow chart of cyclic preparation for titanium boride and sodium cryolite in the invention.

Further detailed description is made below to the invention with reference to the embodiments.

Embodiment 1

0.62 tons of boric acid or 0.35 tons of boric anhydride is put in a reaction kettle, which is then added with 4 tons of hydrofluoric acid with the mass percent of 20% for reaction at 100° C. to generate fluoboric acid; the fluoboric acid is added with 3 tons of sodium carbonate aqueous solution with the mass percent of 20% for reaction to generate sodium fluoborate solution, the sodium fluoborate solution is concentrated, crystallized and bleached to obtain 0.95 tons of sodium fluoborate; 2 tons of titanium-iron concentrate powder is put in the reaction kettle, which is then added with 4.5 tons of hydrofluoric acid with the volume fraction of 20% for complete reaction at 120° C. to generate fluotitanic acid, and the fluotitanic acid, after being cooled, is added with 10 tons of the mixed salt aqueous solution of sodium carbonate and sodium hydroxide with the mass percent of 10%, pH is controlled within a range from 3 to 4, and after water and oxides of ferrous iron and ferric iron are separated, 4 tons of the mixed salt aqueous solution is further added to result in pH within a range from 7 to 8 so as to obtain sodium fluotitanate solution, the sodium fluotitanate solution is concentrated, crystallized and bleached to obtain sodium fluotitanate, and 1.24 tons of sodium fluotitanate is weighed from the obtained sodium fluotitanate; 0.95 tons of sodium fluoborate and 1.24 tons of sodium fluotitanate are uniformly mixed and then put in a reactor, argon is fed into the reactor after evacuation, the reactor is heated up to 700° C. and then slowly and dropwise added with 0.53 tons of molten aluminum based on reaction ratio, rapid stirring is performed, and complete reaction is achieved 5 hours later so as to generate titanium boride and sodium cryolite; the molten liquid sodium cryolite is sucked out, cooled, crushed and weighed, and then quantitatively fed into a rotary reaction kettle together with the concentrated sulfuric acid which is added based on reaction ratio, reaction is performed within a temperature range from 400° C. to 500° C. to generate hydrogen fluoride gas as well as sodium aluminum sulfate and sodium sulfate, the hydrogen fluoride gas is collected and dissolved in water to obtain hydrofluoric acid, the mixture of the sodium aluminum sulfate and the sodium sulfate is crushed and then mixed with sodium hydroxide aqueous solution for reaction, and sodium sulfate solution is obtained after solid aluminum hydroxide is separated; the obtained hydrofluoric acid aqueous solution is recycled either for leaching titanium-iron concentrate to prepare sodium fluotitanate, or for leaching boric acid or boric anhydride to prepare sodium fluoborate.

Embodiment 2

0.62 tons of boric acid or 0.35 tons of boric anhydride is put in a reaction kettle, which is then added with 4 tons of hydrofluoric acid with the mass percent of 20% for reaction at 100° C. to generate fluoboric acid; the fluoboric acid is added with 3 tons of sodium carbonate aqueous solution with the mass percent of 20% for reaction to generate sodium fluoborate solution, the sodium fluoborate solution is concentrated, crystallized and bleached to obtain 0.95 tons of sodium fluoborate; 2 tons of titanium-iron concentrate powder is put in the reaction kettle, which is then added with 4.5 tons of hydrofluoric acid with the volume fraction of 20% for complete reaction at 120° C. to generate fluotitanic acid, and the fluotitanic acid, after being cooled, is added with 10 tons of the mixed salt aqueous solution of sodium carbonate and sodium hydroxide with the mass percent of 10%, pH is controlled within a range from 3 to 4, and after water and oxides of ferrous iron and ferric iron are separated, 4 tons of the mixed salt aqueous solution is further added to result in pH within a range from 7 to 8 so as to obtain sodium fluotitanate solution, the sodium fluotitanate solution is concentrated, crystallized and bleached to obtain sodium fluotitanate, and 1.24 tons of sodium fluotitanate is weighed from the obtained sodium fluotitanate; 0.53 tons of aluminum is weighed based on reaction ratio and put in a reactor, argon is fed into the reactor after evacuation, the reactor is heated up to 700° C. and then added with the mixture of 0.95 tons of sodium fluoborate and 1.24 tons of sodium fluotitanate in a manner of measurable flowing, rapid stirring is performed, and complete reaction is achieved 5 hours later so as to generate titanium boride and sodium cryolite; the molten liquid sodium cryolite is sucked out, cooled, crushed and weighed, and then quantitatively fed into a rotary reaction kettle together with the concentrated sulfuric acid which is added based on reaction ratio, reaction is performed within a temperature range from 400° C. to 500° C. to generate hydrogen fluoride gas as well as sodium aluminum sulfate and sodium sulfate, the hydrogen fluoride gas is collected and dissolved in water to obtain hydrofluoric acid, the mixture of the sodium aluminum sulfate and the sodium sulfate is crushed and then mixed with sodium hydroxide aqueous solution for reaction, and sodium sulfate solution is obtained after solid aluminum hydroxide is separated; the obtained hydrofluoric acid aqueous solution is recycled either for leaching titanium-iron concentrate to prepare sodium fluotitanate, or for leaching boric acid or boric anhydride to prepare sodium fluoborate.

The content discussed above is merely for further detailed description of the invention with reference to the preferred embodiments, and it shall not be considered that the embodiments of the invention are limited to the description only. Many simple deductions or substitutions could be made without departing from the concept of the invention by ordinary skilled in the art to which the invention pertains, and shall be contemplated as being within the scope of the invention.

What is claimed is:

1. A cyclic preparation method for producing titanium boride from intermediate feedstock sodium-based titanium-boron-fluorine salt mixture and producing sodium cryolite as byproduct, wherein the method comprises the following steps:
   A) boric acid or boric anhydride is added with hydrofluoric acid to generate fluoroboric acid by reaction at 100-200° C., the fluoroboric acid is then added with sodium carbonate aqueous solution for reaction to generate sodium fluoborate solution, and the sodium fluoborate solution is concentrated, crystallized and bleached to obtain sodium fluoborate; titanium-iron concentrate is added with hydrofluoric acid to generate fluotitanic acid by reaction at 100-200° C.; the fluotitanic acid is then added with the mixed salt aqueous solution of sodium carbonate and sodium hydroxide, pH is controlled within a range from 3 to 4, and after water and oxides of ferrous iron and ferric iron are separated, the mixed salt aqueous solution is further added to result in pH within a range from 7 to 8 so as to obtain sodium fluotitanate solution, and the sodium fluotitanate solution is concentrated, crystallized and bleached to obtain sodium fluotitanate;
   B) the sodium fluoborate and the sodium fluotitanate are put in a reactor based on a molar ratio of 2:1, inert gas is fed into the reactor after evacuation, the reactor is heated up to 700-800° C. and then added with aluminum, and titanium boride and sodium cryolite are generated by rapid stirring and then reaction for 4-6 hours; or aluminum is put in the reactor, inert gas is fed into the reactor after evacuation, the reactor is heated up to 700-800° C. and then added with the sodium-based titanium-boron-fluorine salt mixture of sodium fluoborate and sodium fluotitanate based on a molar ratio of 2:1, and titanium boride and sodium cryolite are generated by rapid stirring and then reaction for 4-6 hours;
   C) the sodium cryolite is sucked out and then fed into a rotary reaction kettle together with concentrated sulfuric acid, hydrogen fluoride gas as well as sodium sulfate and sodium aluminum sulfate are generated by reaction in the rotary reaction kettle, and the hydrogen fluoride gas is collected and then dissolved in water to obtain hydrofluoric acid; the solid mixture of sodium sulfate and sodium aluminum sulfate is crushed and then dissolved in water, sodium hydroxide is added for the purpose of reaction, and sodium sulfate aqueous solution is obtained after solid aluminum hydroxide is separated; and
   D) the obtained hydrofluoric acid aqueous solution is recycled either for leaching titanium-iron concentrate to prepare sodium fluotitanate, or for leaching boric acid or boric anhydride to prepare sodium fluoborate.

2. The cyclic preparation method for producing titanium boride from intermediate feedstock sodium-based titanium-boron-fluorine salt mixture and producing sodium cryolite as byproduct according to claim 1, wherein in the step B, aluminum under a liquid state is dropwise added to the reactor or the sodium-based titanium-boron-fluorine salt mixture under a dry and flowing state is added to the reactor in a manner of measurable flowing.

3. The cyclic preparation method for producing titanium boride from intermediate feedstock sodium-based titaniumboron-fluorine salt mixture and producing sodium cryolite as byproduct according to claim 1, wherein in the step B, the inert gas is argon.

* * * * *